(12) United States Patent
Marsh et al.

(10) Patent No.: US 6,196,167 B1
(45) Date of Patent: Mar. 6, 2001

(54) COOLING SYSTEM FOR INTERNAL COMBUSTION ENGINE

(75) Inventors: Gregory Alan Marsh; Peter Loring Valentine, both of Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/241,111

(22) Filed: Feb. 1, 1999

(51) Int. Cl.[7] ........................................... F01P 7/14
(52) U.S. Cl. ................................. 123/41.09; 123/41.31
(58) Field of Search .......................... 123/41.08, 41.09, 123/41.1, 41.31, 41.51; 236/34.5

(56) References Cited

U.S. PATENT DOCUMENTS

| | | | |
|---|---|---|---|
| 3,323,502 | * | 6/1967 | Whalen ............................. 132/41.09 |
| 4,548,385 | | 10/1985 | Barbuto . |
| 4,991,546 | * | 2/1991 | Yoshimura ........................ 123/41.09 |
| 5,020,482 | * | 6/1991 | Deutschmann .................... 123/41.09 |
| 5,174,254 | * | 12/1992 | Humburg .......................... 123/41.09 |
| 5,415,147 | | 5/1995 | Nagle et al. . |
| 5,433,267 | * | 7/1995 | Ammer et al. .................... 123/41.08 |
| 5,572,958 | * | 11/1996 | Mader et al. ....................... 123/41.1 |
| 5,598,705 | | 2/1997 | Uzkan . |
| 5,809,944 | * | 9/1998 | Aoki et al. ......................... 123/41.09 |
| 5,950,576 | * | 9/1999 | Busato et al. ..................... 123/41.08 |
| 5,975,031 | * | 11/1999 | Bartolazzi ......................... 123/41.09 |

\* cited by examiner

*Primary Examiner*—John Kwon
(74) *Attorney, Agent, or Firm*—Carl A. Rowold; Jill M. Breedlove (57) ABSTRACT

A cooling system for a turbo-charged internal combustion engine utilizing a unified flow control valve capable of changing the mode of operation of the system in response to a varying heat demand. The unified flow control valve may be a solenoid operated slider valve having a cylinder with connections to the engine water jacket outlet, the intercooler inlet, the radiator inlet and outlet, and the water tank, and a piston having rows of openings which when aligned with the cylinder connections provide flow paths corresponding to various modes of operation.

14 Claims, 7 Drawing Sheets

COOLING SYSTEM FOR INTERNAL COMBUSTION ENGINE

BACKGROUND OF THE INVENTION

The present invention relates to a cooling system for high-power internal combustion engines and, more particularly, to a cooling system for a diesel engine powered locomotive traction vehicle.

Cooling systems for internal combustion engines, such as the diesel engines used in locomotives, are known in the art for the purpose of maintaining engine and lubricating oil temperatures within desired operating ranges. Turbocharged engines are also known to utilize cooling systems for conditioning the combustion inlet air after it is compressed in a turbo-charger. U.S. Pat. No. 5,415,147, incorporated by reference herein, describes a temperature regulating system for a turbocharged locomotive engine that is specifically designed to address the need for different cooling modes dependent upon changes in ambient air temperature and engine load. In one flow path taught in that patent, coolant heated by the engine is cooled by a primary radiator having a split outflow such that a portion may be further cooled in a subcooler. The coolant portion flowing through the subcooler is directed either to an engine intake air intercooler or back to a water reservoir. In a second flow path, heated coolant from the engine may be directed to the intercooler to heat the engine intake air.

The temperature regulating system of U.S. Pat. No. 5,145,147 defines three modes of operation as follows:

Mode 1: The entire hot coolant outflow from the engine is directed to the radiator/subcooler. Coolant passing through the subcoolers is used to cool the engine intake air in the intercooler. Mode 1 is used when coolant temperatures are highest, such as when the engine is at the highest power levels and/or when the highest ambient air temperatures are encountered.

Mode 2: The radiator/subcooler are used to cool only a portion of the hot coolant outflow from the engine. The remainder is used to heat the engine intake air in the intercooler. Mode 2 is used when coolant temperature is high enough to warrant cooling but heating of the intake air is desired to obtain optimal engine operation.

Mode 3: None of the coolant outflow from the engine is cooled in the radiator, but some of this heated coolant is used to heat the engine intake air in the intercooler. The radiator and subcooler are drained in this mode. Mode 3 is utilized when the heat demand on the engine is lowest, such as at low power loads and/or cold ambient air temperatures.

The particular flow paths for each of the three modes described above are disclosed in U.S. Pat. No. 5,415,147 along with the flow control system valving required to implement this cooling flow control system. The flow control system includes a two-position three-way "T-port" rotary valve shafted to an external air powered actuator (item 112 of the patent) and an associated on-off butterfly valve (item 206) for drainage of radiator inlet piping, and a second two-position three-way "L-port" valve shafted to an external air powered actuator (item 144) and its associated second on-off butterfly valve (item 168) for drainage of the subcooler outlet piping. Table 1 below illustrates the possible combinations of valve positions for the three way valves, with the flow ports of the valves designated as A, B and C. Three of the four combinations are used for implementing modes 1, 2, and 3 described above, and the fourth combination is unused in the prior art embodiments.

TABLE 1

Cooling System Mode vs Valve Position

| Mode | T 3-way | T 2-way | L 3-way | L 2-way | Flow Path |
|---|---|---|---|---|---|
| 3 | C to B | Open | C to B | Open | Eng to W/T & I/C Rad & S/C to W/T |
| 2 | C to A | Closed | C to B | Open | Eng to Rad & I/C, S/C to W/T |
| 1 | C to A | Closed | A to B | Closed | Eng to Rad, S/C to I/C |
| X | C to B | Open | A to B | Closed | Not Used |

The following abbreviations are used in Table 1: Eng for engine; W/T for water tank; I/C for intercooler; Rad for radiator; and S/C for subcooler.

Note that the fourth mode, indicated by Mode "X" in Table 1, is not used in the system described in U.S. Pat. No. 5,415,147, but is nonetheless available and may become "operational" due to a failure(s) in the valves.

The prior art system provides several operational advantages. However, it contains many valves and piping connections, thereby increasing the cost of manufacturing, the cost of operation, and the overall reliability of the system. Accordingly, it is an object of this invention to provide a cooling system for a turbo-charged internal combustion engine that provides all of the operational flexibility of the prior art system of U.S. Pat. No. 5,415,147 while being simpler and less expensive to construct and to operate. It is a further object of this invention to provide a cooling system and that is more reliable in its operation than prior art systems.

SUMMARY OF THE INVENTION

Accordingly, a cooling system for a turbo-charged internal combustion engine is disclosed having: a water tank operable to contain cooling water and having an inlet and an outlet; a pump operable to circulate water throughout the cooling system and having a inlet connected to the water tank outlet and an outlet; an engine water jacket associated with the engine and having an inlet connected to the pump outlet and an outlet; a combustion air intercooler having an outlet connected to the water tank inlet and an inlet; a radiator having an inlet and an outlet; and a flow control valve having connections to the water jacket outlet, the intercooler inlet, the radiator inlet, the radiator outlet, and the water tank inlet. More particularly, the flow control valve defines three flow paths for the cooling water: a first flow path connecting the water jacket outlet to the radiator inlet, and connecting the radiator outlet to the intercooler inlet; a second flow path connecting the water jacket outlet to the radiator inlet and the intercooler inlet, and connecting the radiator outlet to the water tank inlet; and a third flow path connecting the water jacket outlet to the intercooler inlet and the water tank inlet, and connecting the radiator inlet and outlet to the water tank inlet. The flow control valve may further have a cylinder having openings connected to the water jacket outlet, the intercooler inlet, the radiator inlet, the radiator outlet, and the water tank inlet; a piston disposed within the cylinder and having a plurality of openings formed therein, the piston operable to be moved to three positions within the cylinder, each position corresponding to one of the three flow paths.

DETAILED DESCRIPTION OF THE INVENTION

Figure 1:
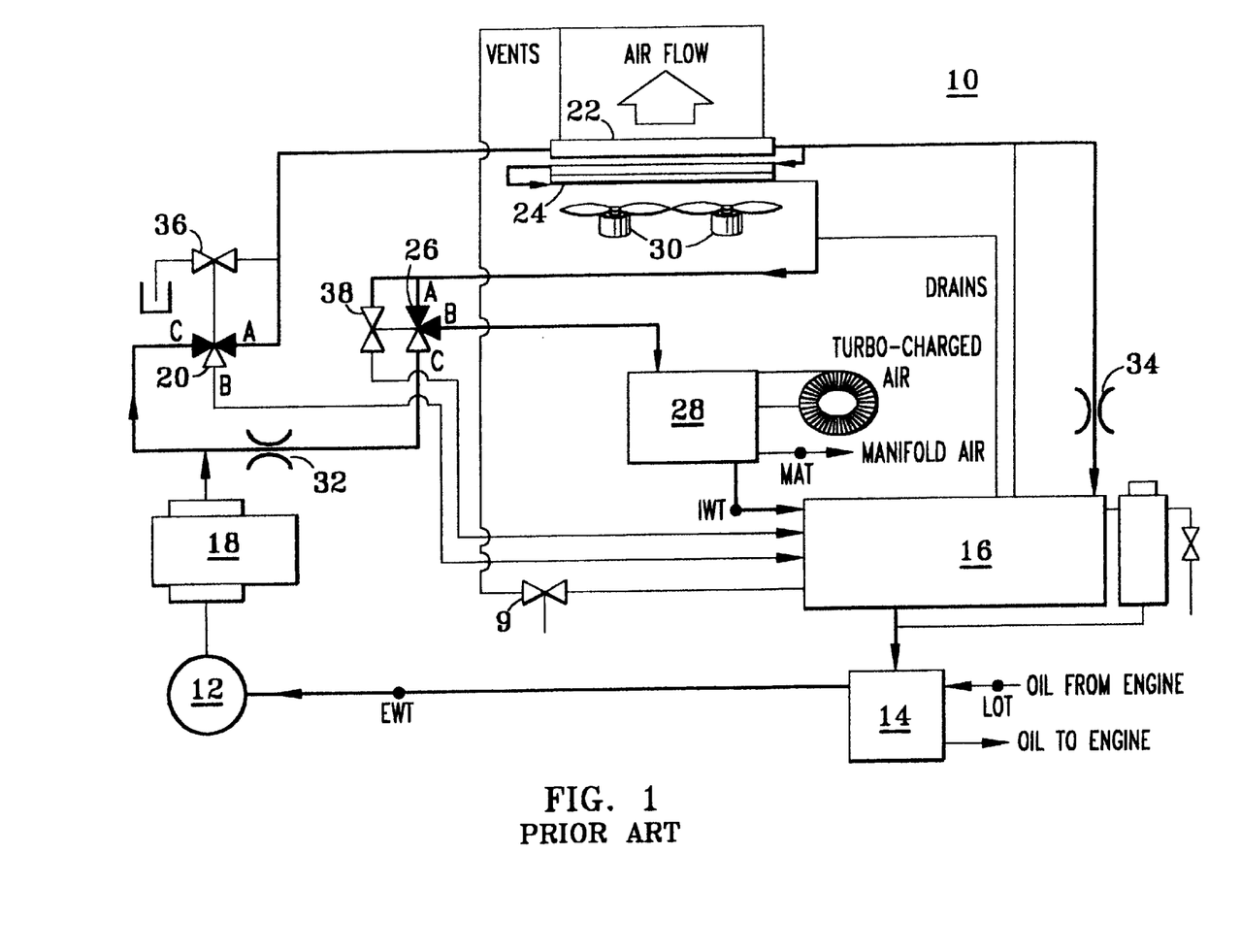
FIG. 1 depicts the heat regulating system disclosed in the prior art, as it would operate in Mode 1.
Figure 2:
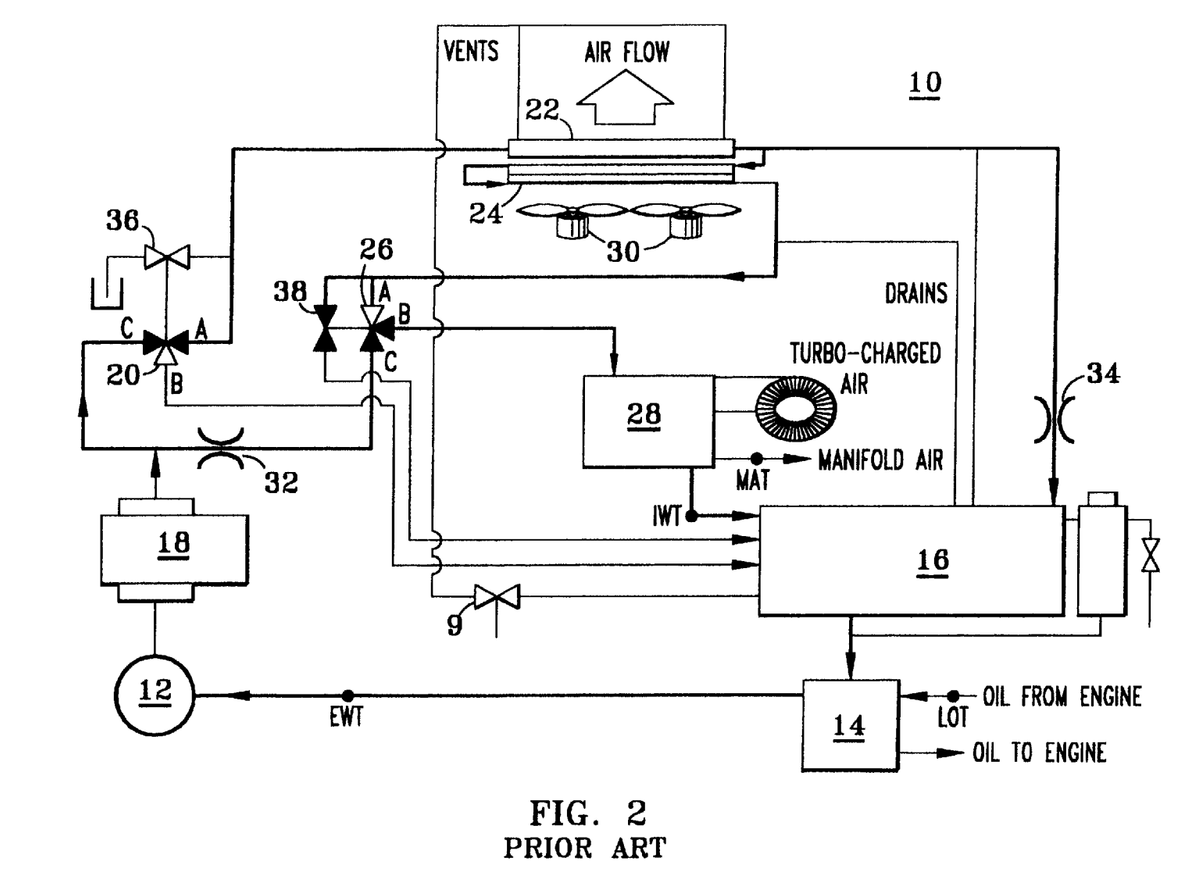
FIG. 2 depicts the heat regulating system disclosed in the prior art, as it would operate in Mode 2.
Figure 3:
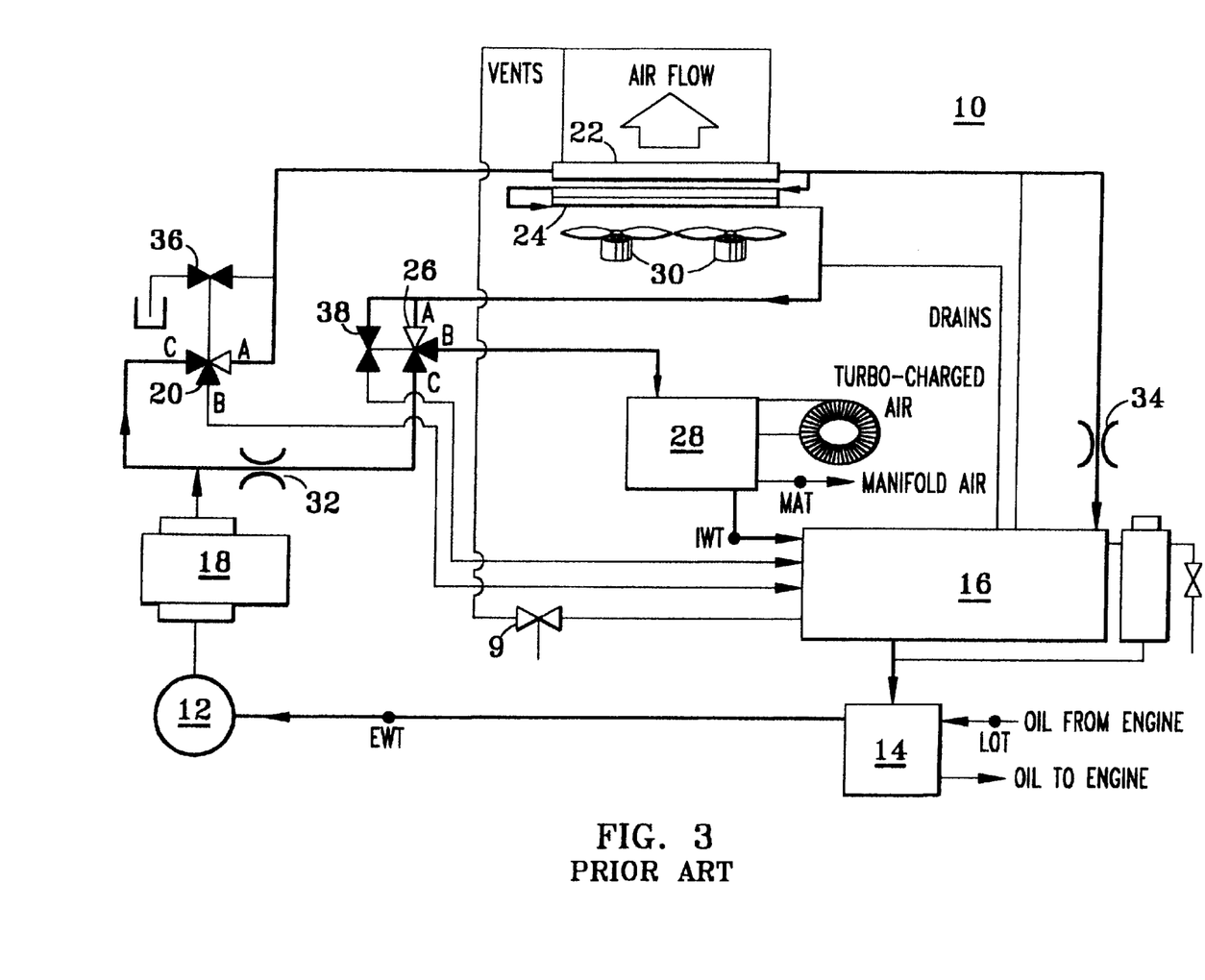
FIG. 3 depicts the heat regulating system disclosed in the prior art, as it would operate in Mode 3.

In order to understand the improvements offered by the present invention, it is useful to analyze the heat regulating systems as disclosed in prior art U.S. Pat. No. 5,415,147. FIGS. 1–3 illustrate the flow paths of the three operational modes of a heat regulating system as disclosed in that patent, with like structures being numbered consistently among all of the Figures in this application. Note that there are no structural differences between the systems in FIGS. 1–3. Rather, the differences are related solely to the positions of the valves in the system.

FIG. 1 illustrates mode 1 operation of a prior art system 10 in which cooling water is drawn by pump 12 through oil cooler 14 from a water tank 16. The cooling water is directed to the water jacket 18 of an internal combustion engine where heat is transferred from the engine to the cooling water. Hot coolant outflow from the engine water jacket 18 flows through three-way "T-port" valve 20 to radiator 22. A portion of the flow exiting the radiator 22 flows directly to the water tank 16, while a second portion is further cooled in subcooler 24 and is then directed through three way "L-port" valve 26 to inlet air intercooler 28 before being directed back to the water tank 16. Fan 30 provides cooling air to the radiator 22 and subcooler 24, and orifices 32,34 provide the desired flow balance between the alternative coolant flow paths. Note the positions of the three way valve assemblies 20,26. In Mode 1, the three-way "T-Port" valve 20 is positioned to pass flow from C to A, as indicated by a black valve body on the figure, and the associated two-way butterfly valve 36 is closed, as indicated by a white valve body on the figure. The three-way "L-Port" valve 26 is positioned A to B, and its associated butterfly valve 38 is closed. In Mode 1, all of the coolant exiting the engine water jacket 18 must flow to the C Port of valve 20 where it then exits through Port A. The coolant then passes through the radiator 22. The outflow from the radiator 22 is split, with a portion of the coolant going directly to the water tank 16 through orifice 34, and the remainder going to subcooler 24 for further cooling by fan 30. The coolant traveling through the subcoolers 24 is directed to Port A of valve 26. Upon exiting valve 26 through Port B, the coolant then flows to the intercooler 28, where the coolant is used to cool the engine intake air. This portion of the coolant then returns to the water tank 16.

FIG. 2 illustrates the prior art cooling system of FIG. 1 with valves 20,26,36,38 in position for mode 2 operation. Valve 20 is positioned C to A, and its associated butterfly valve 36 is closed, as in Mode 1. Valve 26, however, is positioned C to B, allowing a portion of the heated coolant exiting the engine water jacket 18 to flow to intercooler 28 to heat the incoming combustion air. This position of valve 26 also prevents cooled water from the subcooler 24 outlet from entering intercooler 28. Butterfly valve 38 is open in order to direct the portion of the coolant that has been cooled in radiator 22 and subcooler 24 to water tank 16.

Referring now to FIG. 3, Mode 3 which is for the coldest operating conditions, requires the radiator 22 and subcooler 24 to be completely bypassed and drained to water tank 16. Valve 26 directs a portion of the heated coolant exiting the water jacket 18 to intercooler 28, with the remainder of the flow being directed to the water tank 16 by valve 20. Valves 36,38 are opened to allow the radiator 22 and subcooler 24 to drain, preferably by the force of gravity alone, to water tank 16.

Figures 4, 5, 6:
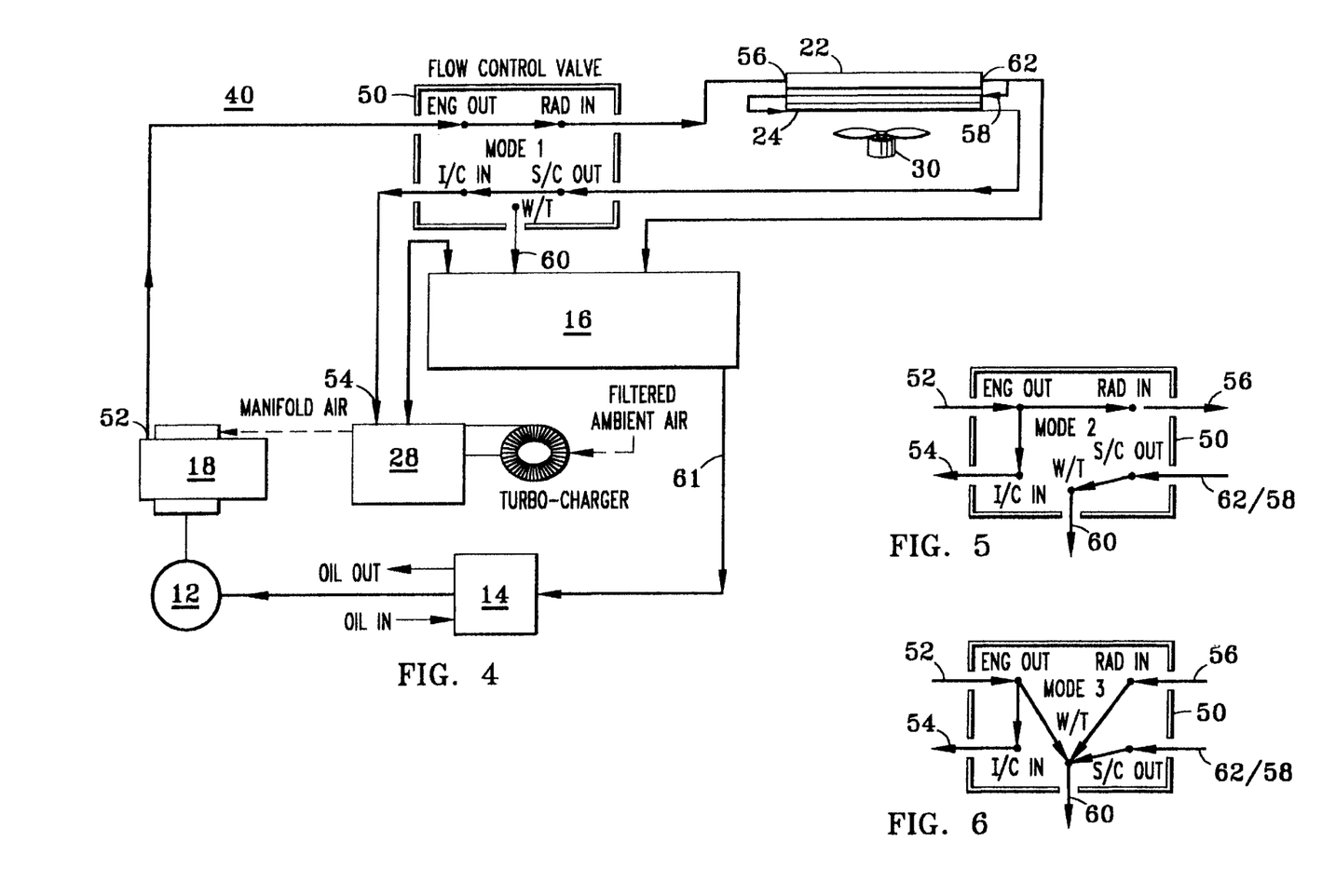
FIG. 4 depicts a schematic of a cooling system in accordance with the present invention utilizing a unified control valve for Mode 1 operation.
FIG. 5 illustrates the flow path through the integrated control valve of FIG. 4 as it would be configured for Mode 2 operation.
FIG. 6 illustrates the flow path through the integrated control valve of FIG. 4 as it would be configured for Mode 3 operation.

FIG. 4 illustrates a schematic of a cooling system 40 built in accordance with the present invention. FIG. 4 illustrates the cooling system 40 aligned to operate in mode 1 as discussed above. The cooling system 40 is similar in function to cooling system 10 shown in FIGS. 1–3, but importantly valves 20,26,36,38 and much of the associated piping of the prior art have been replaced by an integrated flow control valve 50. Modes 1–3 can be achieved by operating flow control valve 50 to change the interconnections among the various system components as illustrated in FIGS. 4–6 respectively.

Referring to FIG. 4, flow control valve 50 has connections to the outlet 52 of engine water jacket 18, to the inlet 54 of intercooler 28, to the inlet 56 of radiator 22, to the outlet 58 of subcooler 24, and to the inlet 60 of water tank 16. Water tank 16 has an outlet that is in fluid communication with water jacket 18, in this embodiment through oil cooler 14 and pump 12. Also note that outlet 62 of radiator 22 is connected to flow control valve 50 through the subcooler 24, although in some embodiments it may be connected directly if no subcooler is provided. Flow control valve 50 is illustrated in FIG. 4 in a first position where the water jacket outlet 52 is connected to radiator inlet 56, and radiator outlet 62 (and subcooler outlet 58) is connected to intercooler inlet 54. In this position the water tank inlet connection 60 is isolated. Thus, the system 40 of FIG. 4 functions the same as system 10 of FIG. 1 but with a significantly reduced number of active components and piping connections.

FIG. 5 is a schematic diagram of the integrated flow control valve 50 of FIG. 4 but configured in a second position in order to provide for mode 2 operation of coolant system 40. In FIG. 5, flow control valve 50 provides a second flow path for system 50 which connects water jacket outlet 52 to both the radiator inlet 56 and the intercooler inlet 54, and connects the radiator outlet 62 (or subcooler outlet 58) to the water tank inlet 60. Thus, the system 40 of FIG. 4, with flow control valve configured as shown in FIG. 5, functions the same as system 10 of FIG. 2 but with a significantly reduced number of active components and piping connections.

FIG. 6 is a schematic diagram of the integrated flow control valve 50 of FIG. 4 configured in a third position in order to provide for mode 3 operation of coolant system 40.

In FIG. 6, flow control valve 50 provides a third flow path for system 40 that connects water jacket outlet 52 to both the intercooler inlet 54 and the water tank inlet 60 in order to provide heat to the incoming combustion air. The flow control valve 50 also connects both the radiator inlet 56 and radiator outlet 62 (or subcooler outlet 58) to water tank inlet 60 to provide for draining of the radiator 22 and subcooler 24. Thus, the system 40 of FIG. 4, with flow control valve configured as shown in FIG. 6, functions the same as system 10 of FIG. 3 but with a significantly reduced number of active components and piping connections.

Figure 7:
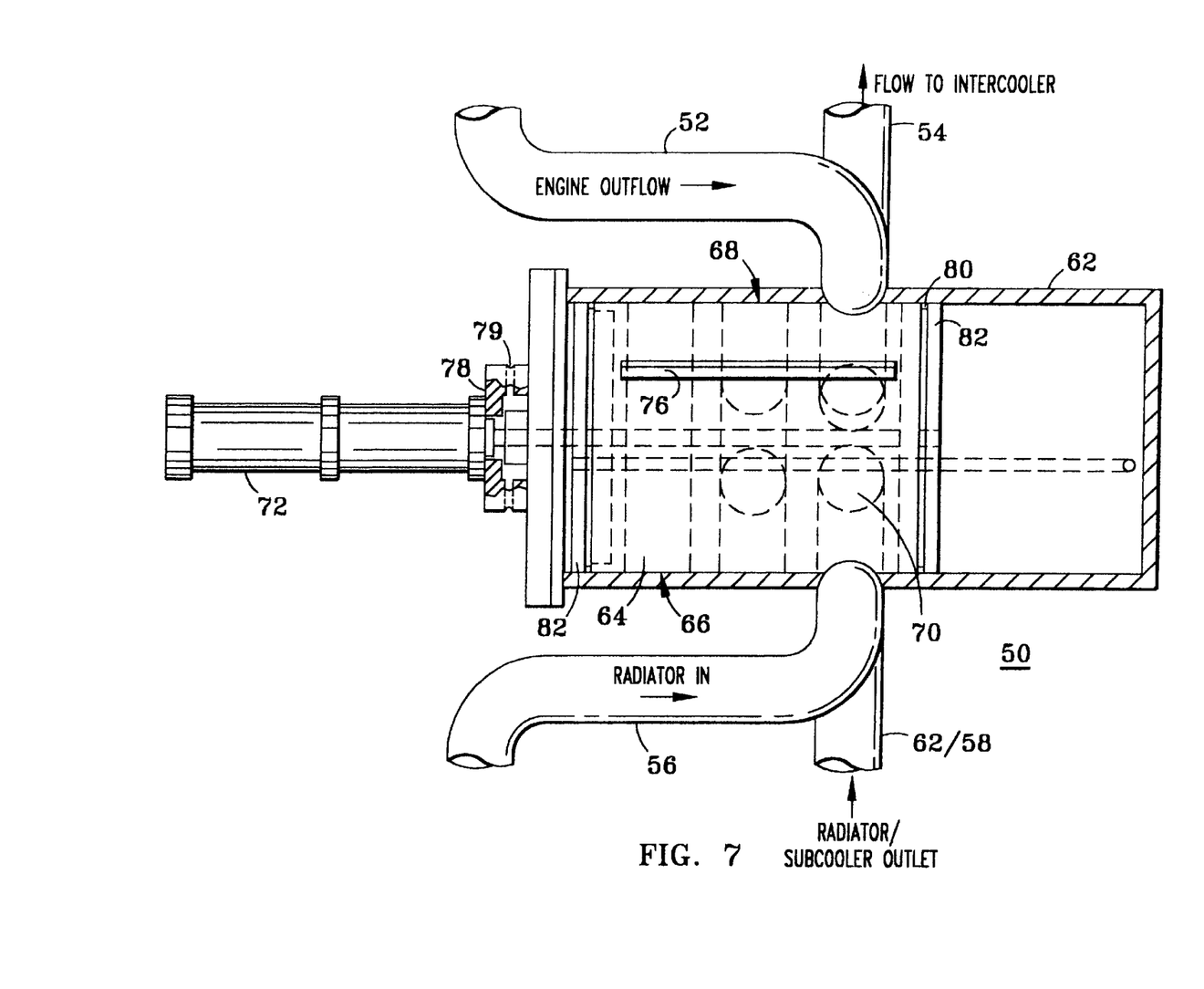
FIG. 7 depicts a top view of an integrated flow control valve in accordance with the present invention.
Figure 8:
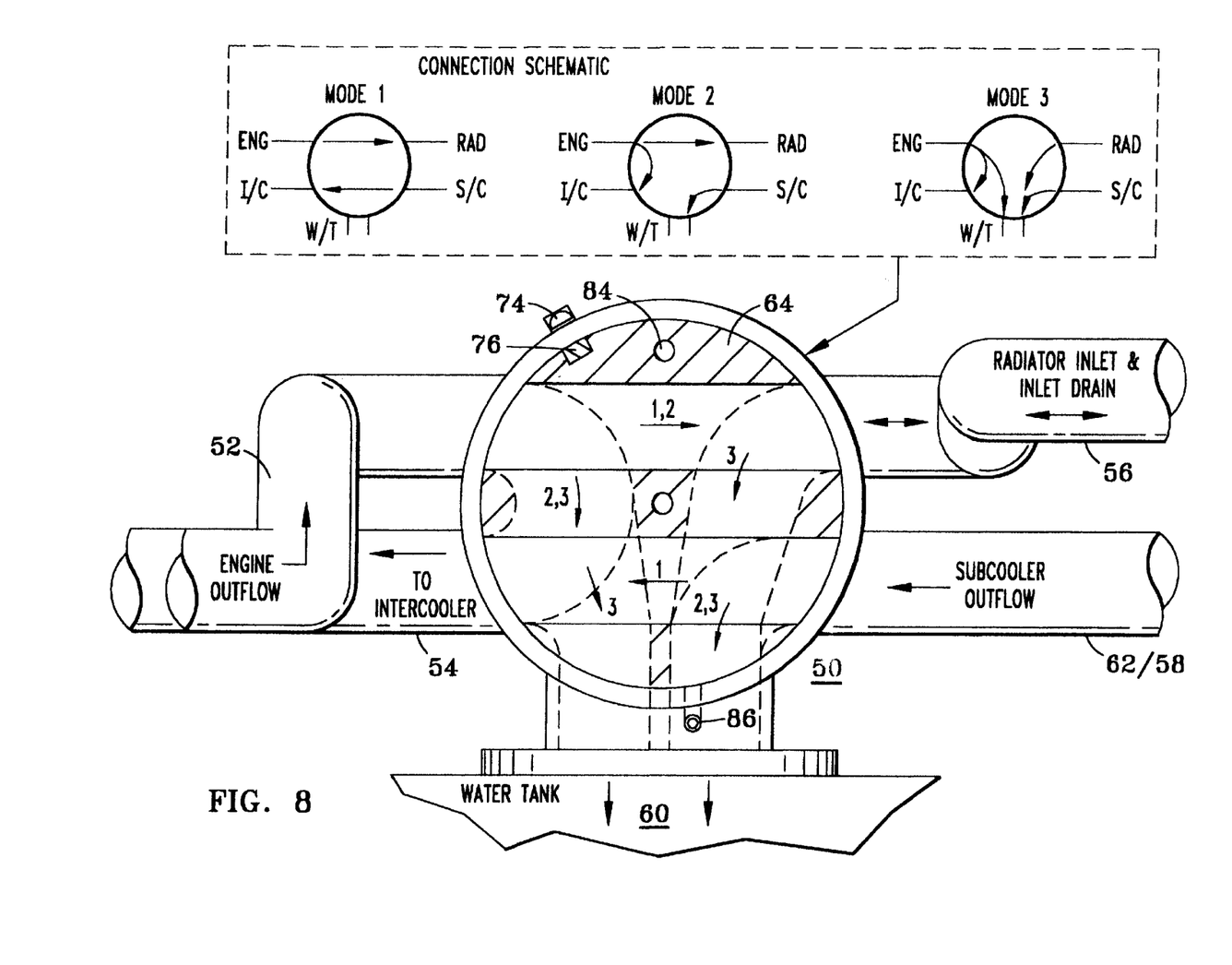
FIG. 8 depicts an end view of the integrated flow control valve of FIG. 7.
Figure 9:
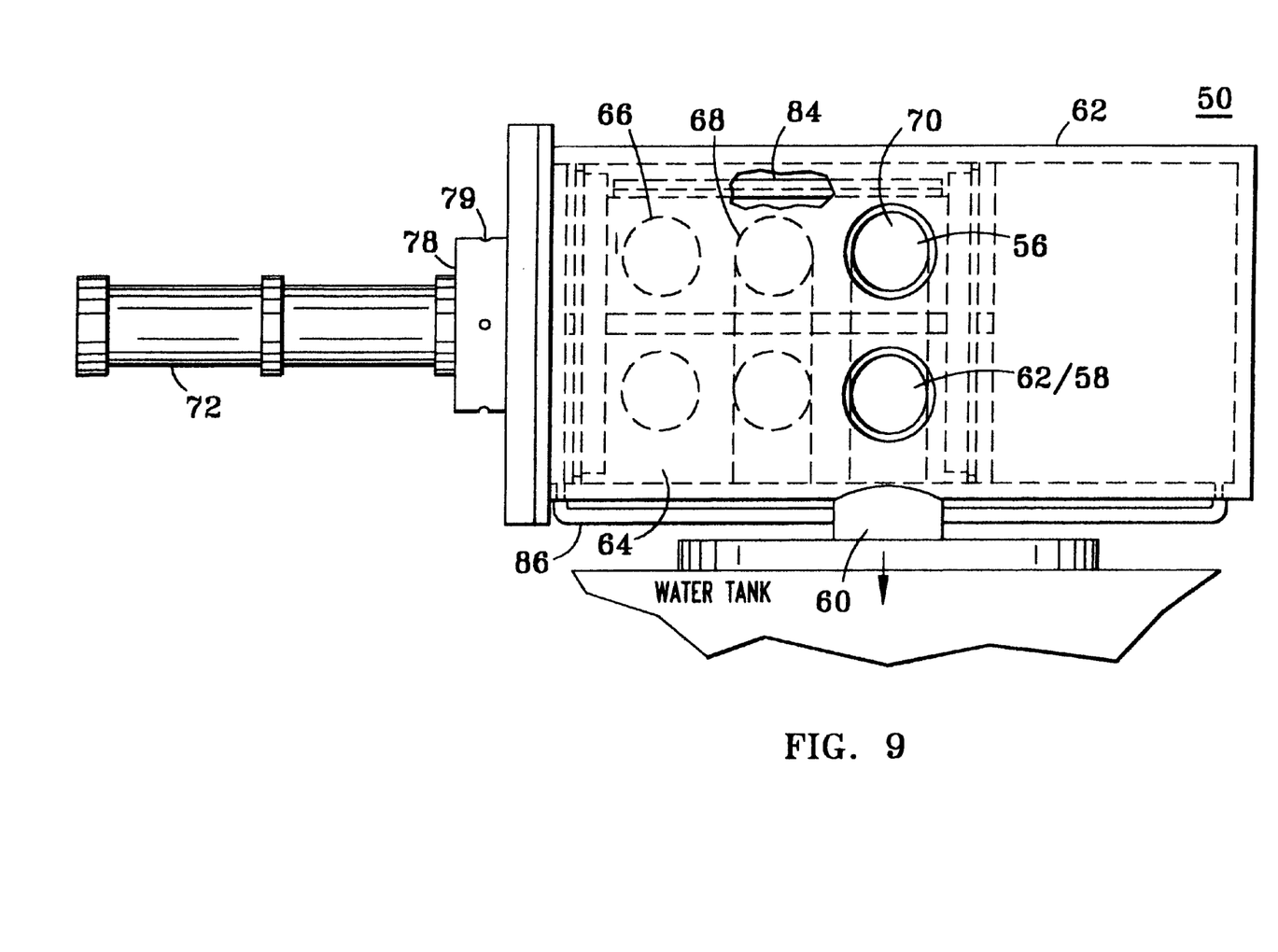
FIG. 9 depicts a side view of the integrated flow control valve of FIG. 7.

FIGS. 7–9 illustrate various views of an embodiment of the flow control valve 50 of the present invention. Like structures are numbered consistently in the various views, and the Figures may best be viewed together in conjunction with the following description. The illustrated embodiment of flow control valve 50 is a "slider" valve design containing an outer cylinder 62 and a linearly movable piston 64. The piston 64 contains three alternative sets of openings 66,68, 70. Each of these sets of openings 66,68,70 may alternately be aligned with the single set of openings in the wall of the cylinder 62 by a sliding motion of the piston 64. Alignment of openings 66,68, or 70 with the openings in the wall of cylinder 62 will complete the flow path necessary to achieve the desired mode 1, 2 or 3 respectively. The openings in the wall of the cylinder 62 are connected in flow communication with the water jacket outlet 52, intercooler inlet 54, radiator inlet 56 and outlet 62, and water tank inlet 60. By allowing only three possible modes of operation, the present invention eliminates the failure mode inherent in mode X of the prior art as illustrated in Table 1 above.

A single actuator, such as three-position pneumatic actuator 72 is provided to slide piston 64 to the positions necessary to achieve the desired flow path for the various modes. For example, if the actuator 72 is fully inserted into the cylinder 62, piston 64 will be in a first position aligning the openings 66 in the piston 64 with openings in the cylinder 62 corresponding to connections 52,54,56,58/62. In this first position flow control valve 50 will function to provide the mode 1 flow path illustrated in FIG. 4. Similarly, if the actuator 72 is operated to move piston 64 to a position closest to the actuator 72, the flow openings 70 will be aligned with connections 52,54,56,58/62,60 to form the flow path shown in FIG. 6 for mode 3. An intermediate actuator position will align the openings 68 with the same connections but in a different alignment to form the flow path shown in FIG. 5 for Mode 2.

To ensure the proper alignment of the openings 66,68,70 in the piston with the openings in the cylinder, the piston 64 must be prevented from rotating about its central axis. Thus, an anti-rotation pin 74 is provided in the cylinder 62 to interface with a groove 76 formed in the piston 64. Alternatively, actuator 72 may be provided with an anti-rotation feature, provided the piston 64 is prevented from rotating in relation to the actuator 72. Alternatively, the anti-rotation feature may be provided in the adapter 78 between the cylinder 62 and the actuator 72. Adapter 78 may also be provided with a vent 79 to ensure that the compressed air utilized to power the actuator 72 does not enter the cooling system 40 by leaking into flow control valve 50.

The flow control valve 50 may be constructed of standard materials known in the art for valves, such as steel or aluminum. The openings may be cast or machined. The piston 64 and cylinder 62 may be designed and manufactured to have a close tolerance therebetween in order to eliminate the need for any sealing mechanism between adjacent openings 66,68,70 and at the ends of the piston. Alternatively, elastomeric o-ring or band-type seals 80 may be used at one or more locations. Other sealing techniques are known in the art, such as those disclosed in U.S. Pat. No. 4,548,385. The seals 80 are retained in position by separate seal discs 82 at each end of the cylinder. Alternatively, the seal grooves may be formed to be integral with the piston to make a one-piece piston design.

A breather passage 84 is required to allow the piston 64 to move back and forth without encountering resistance due to entrapped air. Additionally, a drain connection 86 is provided so that leakage around the piston 64 or seals 80 may be drained to the water tank 16. The separate breather passage 84 may be combined with the drain connection 86, thereby eliminating the need to align the seal discs 82 (if used) in order to keep the breather passage 84 in alignment.

Other embodiments of integral flow control valve 50 may include a spool design, where the same openings in the piston are brought into alignment with three different sets of ports within the cylinder, or a rotary design, where flow paths are defined by a rotor and port arrangement.

As may be appreciated from the Figures, the cooling system of the present invention provides for a reduced number of valves and for the elimination of a significant amount of the flow control piping of the prior art system. It thereby eliminates approximately one-half of the failure modes of the prior art, including parts such as shaft couplings and bolted connections. The design and installation of a system according to the present invention requires less time and less space, and for mobile applications such as a locomotive cooling system, the weight reduction compared to the prior art will provide a corresponding savings in fuel consumption. Furthermore, because the number of valves to be controlled is reduced, the coolant flow control system of the present invention is more reliable and less costly than prior art systems.

What is claimed is:

1. A cooling system for a turbo-charged internal combustion engine for a locomotive or off highway vehicle comprising:

a tank operable to contain coolant and having an inlet and an outlet;

a pump associated with said tank and operable to circulate said coolant throughout the cooling system;

an engine coolant jacket in heat transfer relationship with the engine having an inlet in fluid communication with said tank outlet and outlet;

a combustion air intercooler having an inlet;

a radiator having an inlet and an outlet; and a single flow control valve connected in fluid communication with said water jacket outlet, said intercooler inlet, said radiator inlet, said radiator outlet, and said tank inlet and controllable to operate in a plurality of flow connection modes for selectively regulating the flow of coolant throughout said jacket, intercooler, radiator and tank, and thus the temperature of the engine under varying engine operating and environmental conditions.

2. The cooling system of claim 1, wherein said flow control valve comprises three flow paths for said cooling water:

a first flow path connecting said water jacket outlet to said radiator inlet, and connecting said radiator outlet to said intercooler inlet;

a second flow path connecting said water jacket outlet to said radiator inlet and said intercooler inlet, and connecting said radiator outlet to said water tank inlet; and a third flow path connecting said water jacket outlet to said intercooler inlet and said water tank inlet, and connecting said radiator inlet and outlet to said water tank inlet.

3. The cooling system of claim 2, wherein said flow control valve further comprises:

a cylinder having openings connected to said water jacket outlet, said intercooler inlet, said radiator inlet, said radiator outlet, and said water tank inlet;

a piston disposed within said cylinder and having a plurality of sets of openings formed therein, said piston operable to be moved to a plurality of positions within said cylinder;

a first of said positions aligning the openings in said cylinder with a first set of openings in said piston to form said first flow path;

a second of said positions aligning the openings in said cylinder with a second set of openings in said piston to form said second flow path; and a third of said positions aligning the openings in said cylinder with a third set of openings in said piston to form said third flow path.

4. The cooling system of claim 3, further comprising a means to prevent rotation of said piston within said cylinder.

5. The cooling system of claim 3, further comprising a breather passage connected between opposed ends of said cylinder.

6. The cooling system of claim 5, further comprising a connection between said breather passage and said water tank inlet.

7. The cooling system of claim 3, wherein said flow control valve further comprises an actuator operable to move said piston among said plurality of positions.

8. The cooling system of claim 7, wherein said actuator is operated by pressurized air, and further comprising a vent between said actuator and said cylinder.

9. The cooling system of claim 3, further comprising a seal between said cylinder and said piston.

10. A cooling system for a turbo-charged internal combustion engine having an intercooler for conditioning incoming combustion air for a locomotive or off highway vehicle, the cooling system comprising:

a coolant tank for storing cooling water;

a pump for circulating said coolant throughout the cooling system;

an oil cooler in fluid communication between said tank and said pump;

a water jacket in heat transfer relationship with the engine proximate said engine and in fluid communication with said pump;

a radiator; and a single flow control valve having connections to an outlet of said jacket, an inlet of said intercooler, an inlet of said tank, and an inlet and an outlet of said radiator and controllable to operate in a plurality of fluid flow connection modes for selectively regulating the flow of coolant through said jacket, oil cooler, radiator and tank, and thus the temperature of the engine under varying engine operating and environmental conditions.

11. The cooling system of claim 10, wherein said flow control valve comprises a first set of openings operable to fluidly connect said water jacket outlet to said radiator inlet, and to connect said radiator outlet to said intercooler inlet.

12. The cooling system of claim 11, wherein said flow control valve comprises a second set of openings operable to fluidly connect said water jacket outlet to said radiator inlet and said intercooler inlet, and to connect said radiator outlet to said water tank inlet.

13. The cooling system of claim 12, wherein said flow control valve comprises a third set of openings operable to fluidly connect said water jacket outlet to said intercooler inlet and said water tank inlet, and to connect said radiator inlet and outlet to said water tank inlet.

14. The cooling system of claim 13, wherein said flow control valve further comprises:

a cylinder having connections to said water jacket outlet, said intercooler inlet, said radiator inlet and outlet, and said water tank inlet; and a piston disposed with said cylinder and having said first, second and third sets of openings formed therein.

* * * * *